No. 637,297. Patented Nov. 21, 1899.
G. S. STRONG.
POWER TRANSMITTING MECHANISM.
(Application filed Dec. 8, 1898.)
(No Model.) 7 Sheets—Sheet 1.
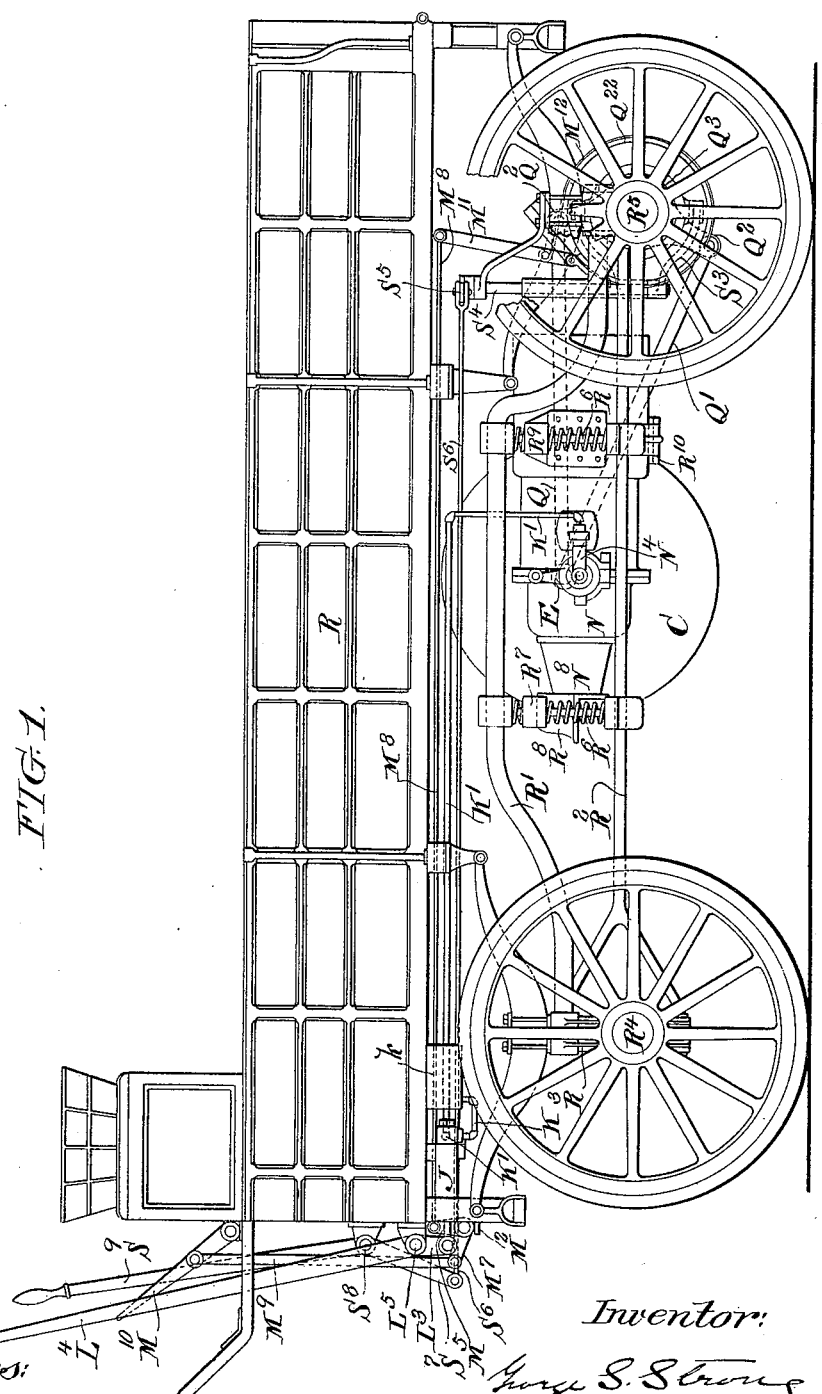
Witnesses:
Inventor:

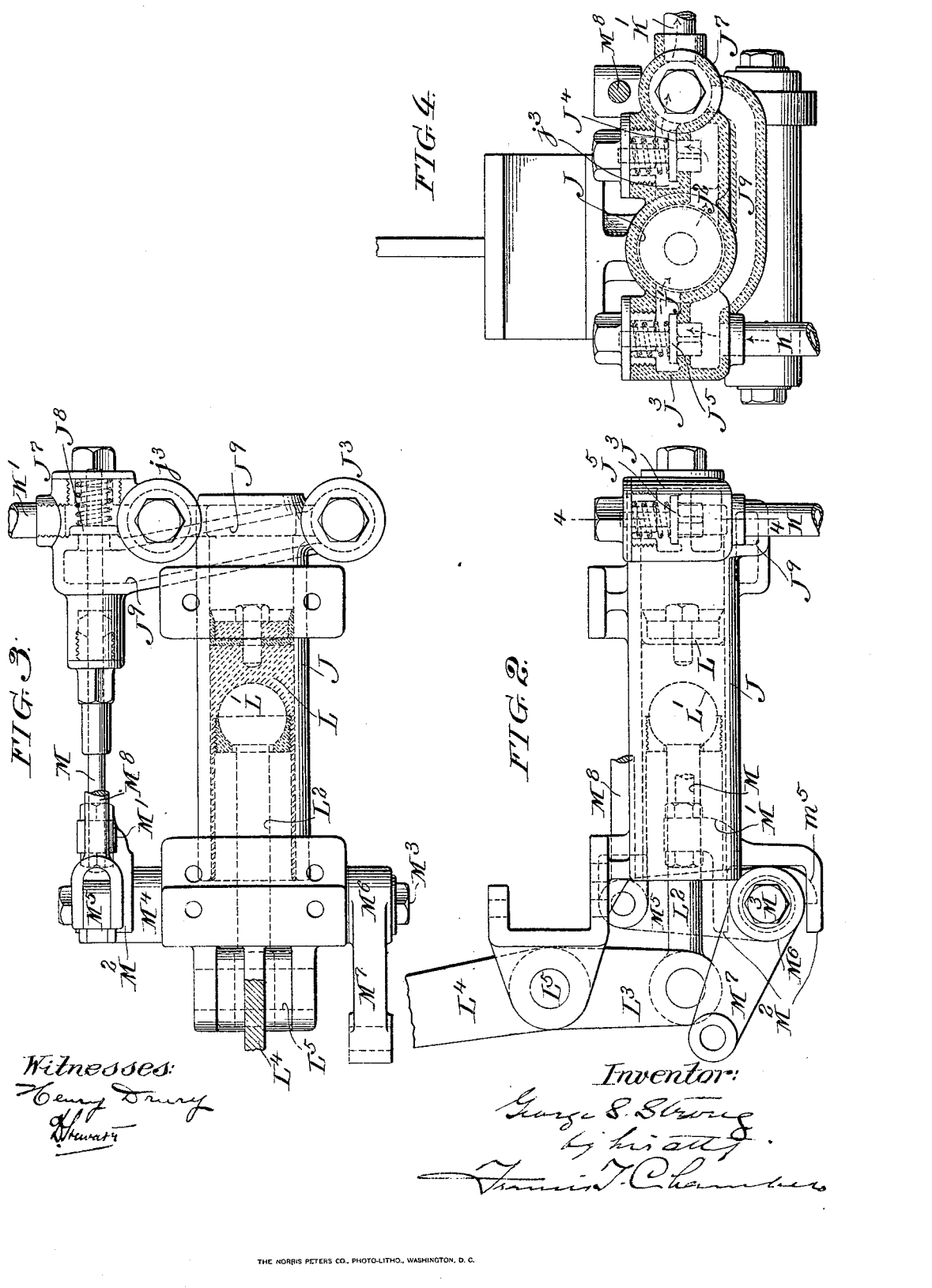

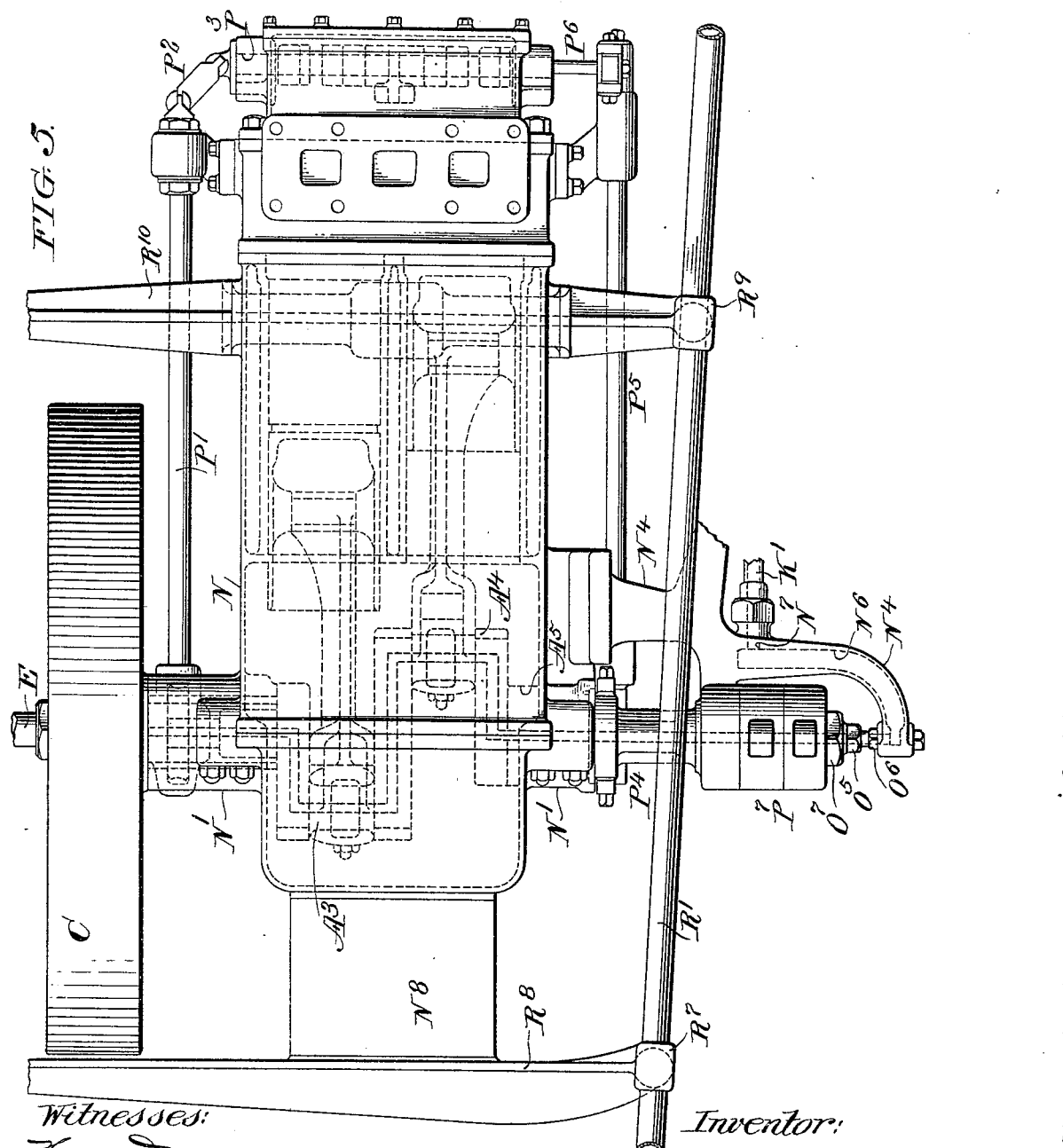

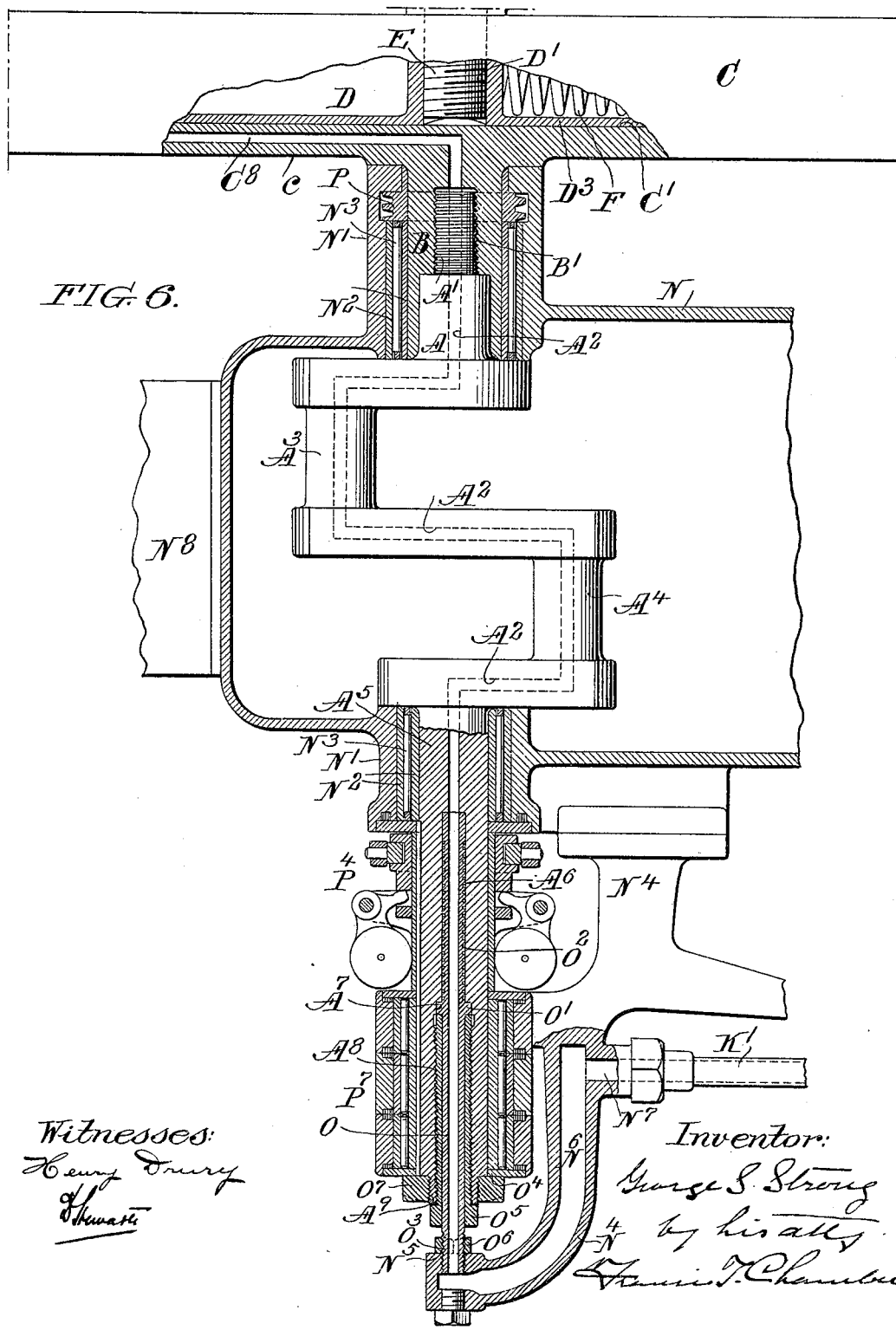

No. 637,297. Patented Nov. 21, 1899.
G. S. STRONG.
POWER TRANSMITTING MECHANISM.
(Application filed Dec. 8, 1898.)
(No Model.) 7 Sheets—Sheet 5.
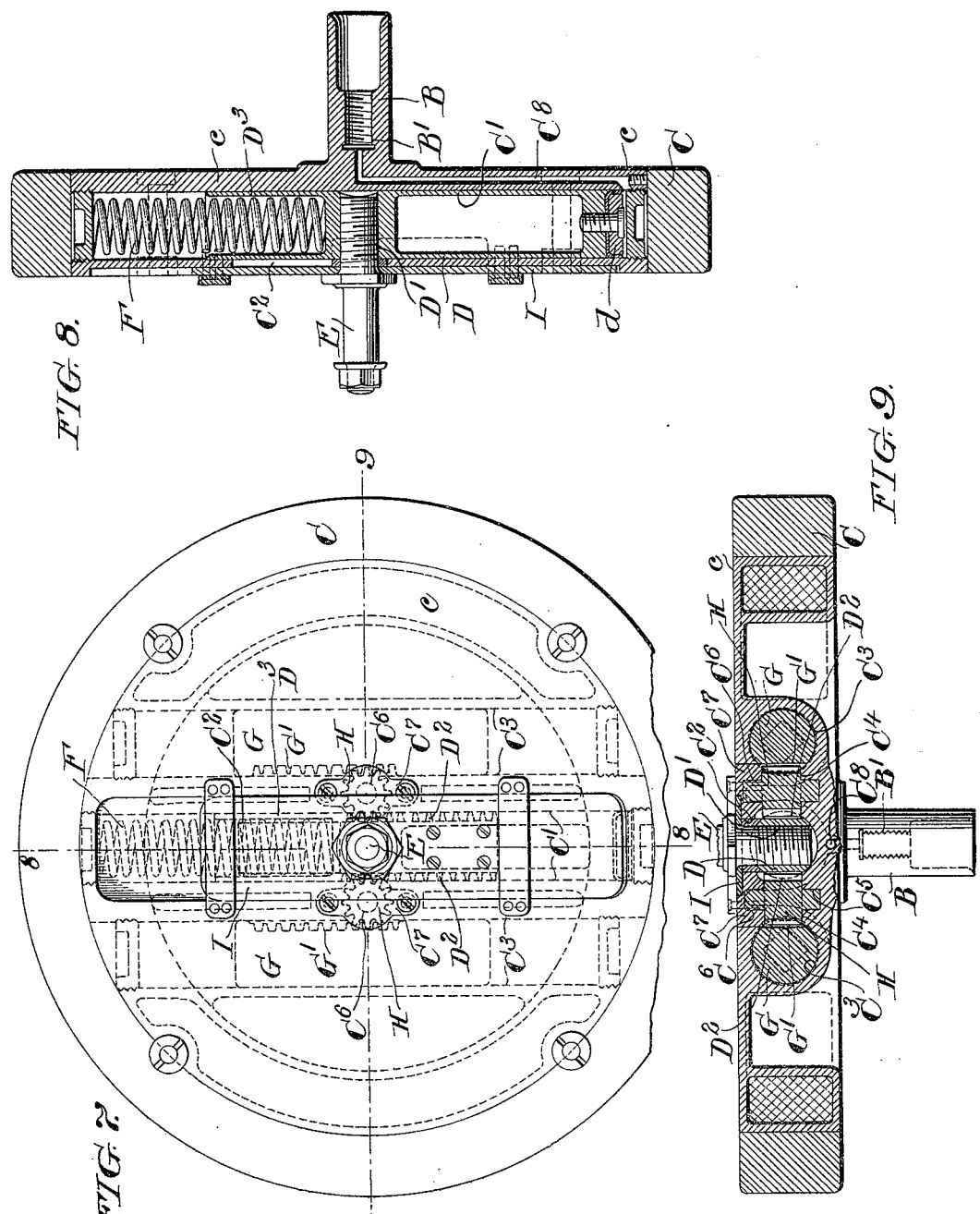

No. 637,297. Patented Nov. 21, 1899.
G. S. STRONG.
POWER TRANSMITTING MECHANISM.
(Application filed Dec. 8, 1898.)
(No Model.) 7 Sheets—Sheet 6.

Witnesses
Inventor
George S. Strong
By his Attorney

No. 637,297. Patented Nov. 21, 1899.
G. S. STRONG.
POWER TRANSMITTING MECHANISM.
(Application filed Dec. 8, 1898.)
(No Model.) 7 Sheets—Sheet 7.

UNITED STATES PATENT OFFICE.

GEORGE S. STRONG, OF NEW YORK, N. Y., ASSIGNOR TO JOHN P. MURPHY, OF PHILADELPHIA, PENNSYLVANIA.

POWER-TRANSMITTING MECHANISM.

SPECIFICATION forming part of Letters Patent No. 637,297, dated November 21, 1899.

Application filed December 8, 1898. Serial No. 698,623. (No model.)

*To all whom it may concern:*

Be it known that I, GEORGE S. STRONG, a citizen of the United States of America, residing in the city, county, and State of New York, have invented a new and useful Improvement in Power-Transmitting Mechanism, of which the following is a true and exact description, reference being had to the accompanying drawings, which form a part thereof.

My invention relates to mechanism for transmitting power, and particularly to mechanism for transmitting power with variable speed.

My invention has to do particularly with that type of varying-speed-transmitting devices in which the power is transmitted through a crank-pin of variable eccentricity; and the leading feature of my invention has to do with the provision of improved mechanism for adjusting the eccentricity of the crank-pin, the movements of which to and from the center about which it moves I control by means of a hydraulic cylinder seated in the crank-disk of the engine and a plunger moving in such cylinder and in turn controlling the position of the crank-pin.

In connection with the hydraulically-controlled crank-pin a further object of my invention is to balance the weights in the crank-pin disk, to provide in a convenient way for the entrance and exhaust of the motive fluid to the hydraulic cylinder aforesaid, to provide convenient and effective actuating mechanism for the control of the crank-pin, to provide an effective braking device for checking the motion of the engine when desired, and generally to perfect and adapt the mechanism for successful use.

The nature of my improvements will be best understood as described in connection with the drawings, in which they are illustrated, and in which—

Figure 10:
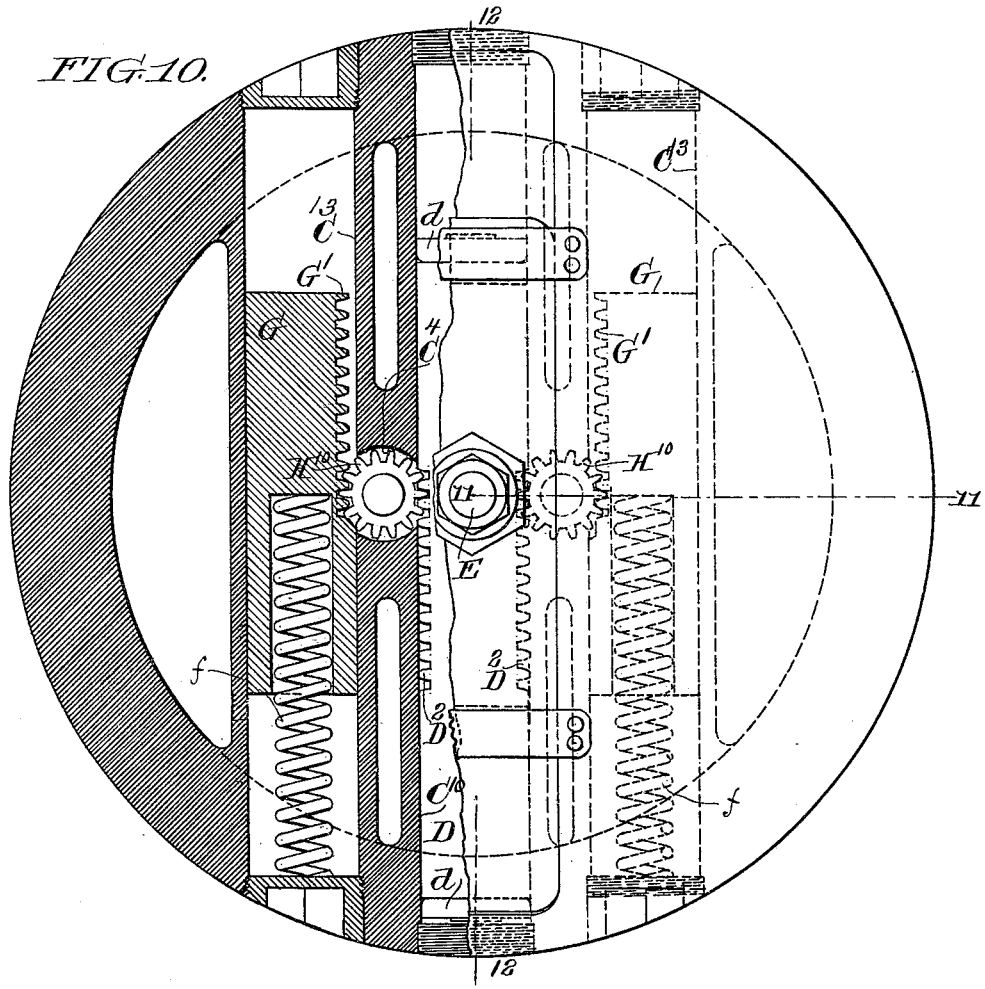
Figure 11:
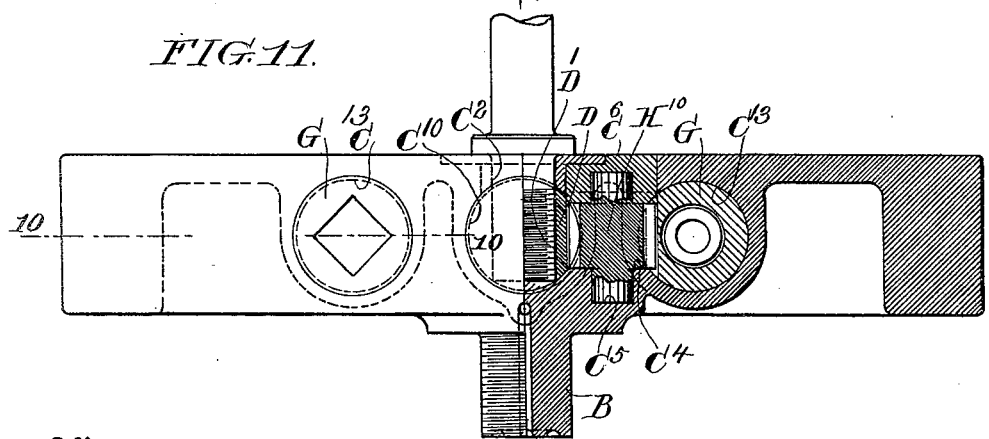
Figure 12:
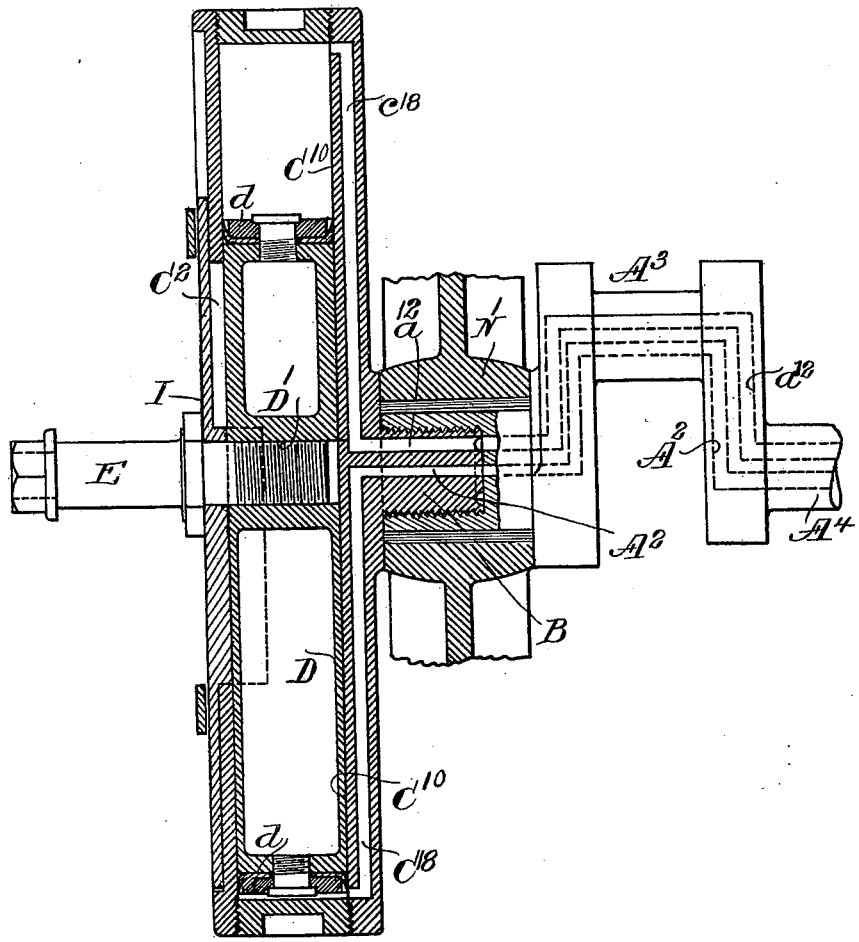

Figure 1 is a side elevation of an automobile vehicle equipped with my improvements, which are especially, though not exclusively, adapted for this use. Fig. 2 is a side elevation, on an enlarged scale, of the pump which I use for controlling the position of the crank-pin. Fig. 3 is a plan view of this pump, and Fig. 4 a cross-sectional view taken as on the section-line 4 4 of Fig. 2. Fig. 5 is a plan view of the engine which I have illustrated in connection with the devices to which my invention peculiarly relates. Fig. 6 is an enlarged plan view of the crank-shaft of the engine and its immediate connections, shown partly in central longitudinal section. Fig. 7 is a face view of the crank-pin disk; Fig. 8, a cross-sectional view taken on the line 8 8 of Fig. 7; Fig. 9, a cross-sectional view taken on the line 9 9 of Fig. 7. Fig. 10 is a face view of a modified form of crank-pin disk, shown partly in section as on the line 10 10 of Fig. 11. Fig. 11 is an edge view of the modified crank-disk, shown partly in section, taken as on the line 11 11 of Fig. 10; and Fig. 12 is again a section through the modified crank-pin disk, taken as on the section-line 12 12 of Fig. 10.

R, Fig. 1, indicates the body of the wagon, which is supported in the usual way on the running-gear, in which the front and rear axles are connected by a truss-frame the compression members of which are indicated at $R'$ and the tension members at $R^2 R^3$, indicating the front bolster to which the ends of the truss members are attached, and $R^4$ the front axle, or rather axles, because stud-axles are usually employed; $R^5$, the rear axles, to the axle-boxes of which the rear ends of the truss-frame may conveniently be connected.

$R^6 R^6$ indicate struts connecting the members $R'$ and $R^2$, as indicated.

$R^7$ indicates ears or projections, only one of which is shown in the drawings, which are formed on a cradle-bar $R^8$, and which are secured on the front struts $R^6$. In a similar way $R^9$, Fig. 1, indicates an ear or projection on a cradle-bar $R^{10}$, (see Fig. 5,) which has two such ears, one connected with each of the rear struts $R^6$. The cradle-bars are then free to move up and down on the struts, but are elastically held in position by springs, as clearly shown in Fig. 1. The cradle-bars $R^8$ $R^{10}$ support the casing N of the engine, (see Figs. 1 and 5,) the casing having a projection $N^8$ in front, by which it is secured to the cradle-bar $R^8$, while the cradle-bar $R^{10}$ is formed in a V shape under the body of the casing.

E (see Fig. 1) indicates a crank-pin driven by an engine contained in the casing N and connecting with rods Q and Q', one of which connects with an upwardly and the other with a downwardly extending clutch-lever $Q^2$, each such lever controlling the movements of one of the clutches, (indicated at $Q^3$,) and which, in any convenient way, are adapted to engage the rear axle $R^5$ when moved in one direction and to move freely on the casing in the other direction.

The parts above described do not form a part of my present invention, though in some features they involve features of construction which I believe to be new with me and which form the subject-matter of my copending application, Serial No. 698,515, filed December 7, 1898.

A, Fig. 6, indicates one end of the crank-shaft of the engine, which, as shown, is formed with a threaded extension A' of smaller diameter. The other end of the crank-shaft is indicated at $A^5$, $A^3$ and $A^4$ indicating the cranks, and a continuous channel $A^2$ being formed through the shaft and cranks, as clearly indicated, the said channel, however, in the portion $A^5$ of the shaft merging into a cylindrical enlargement $A^6$, which in turn merges into a still further enlargement, (indicated at $A^7 A^8$,) the portion $A^8$ being internally threaded. As shown, the extreme outer end of the portion $A^5$ of the shaft is provided with an externally-threaded projection $A^9$.

B, Figs. 6, 8, and 9, is a central projecting stud on the rear face of the crank-disk, having a perforation at its end, adapted to receive the end A of the shaft and a threaded extension B', into which the threaded end A' of the shaft screws, as shown in Fig. 6.

N' and N', Fig. 6, indicate bearings for the crank-shaft formed in the casing N, $N^2$ $N^2$ indicating hard-steel bearing-disks and $N^3$ rollers.

$c$ indicates the crank-disk proper, which in my preferred construction I provide with a steel or iron "rim" or "tire," so to speak, C. In the disk $c$ I form a cylinder C', which may conveniently extend through the disk proper, $c$, as clearly shown in Figs. 7, 8, and 9, the cylinder lying transversely through the center of the disk and being provided with a slot $C^2$ on the front of the disk. On each side of the central cylindrical passage I form in the disk $c$ parallel passages, which may conveniently also be cylindrical, as indicated at $C^3$ $C^3$, and at convenient points, preferably at right angles and through the center of the disk, I form connecting passages $C^4$ $C^4$, opened toward the face of the disk and provided with journal-bearings $C^5$ at their bottom.

$C^6$ $C^6$ indicate blocks or plates for closing the face of these openings $C^4$, which are formed in journal-bearings $C^7$, facing the bearings $C^5$, as is best shown in Fig. 9.

$C^8$ indicates a port or channel formed in the disk $c$, opening near the periphery of this disk into the cylinder C', as shown in Fig. 8, and at the center of the disk into the projecting stud B, so as to communicate freely with the channel $A^2$ in the crank-shaft.

D is a plunger fitting and moving in the cylinder C' and, as shown, formed with a threaded perforation D', into which screws the crank-pin E, the position of this perforation being preferably such that when the cylinder D is at the bottom of its stroke the perforation will coincide with the center of the crank-pin disk.

The plunger D is formed with racks (indicated at $D^2$ $D^2$, Fig. 7) formed on its opposite sides, and, as shown, it is also formed with a spring-receiving cup $D^3$ on its inner end.

F indicates a powerful spring situated in the portion of the cylindrical passage opposite to that in which the plunger works and arranged, as shown, to act against the plunger and hold it normally in the position indicated in Figs. 7 and 8.

G G, Figs. 7 and 9, are counterweights moving in the passages $C^3$ $C^3$ and formed with racks G' on their faces lying opposite to the plunger D.

H H are spur-wheels situated in the passages $C^4$ and provided with journals which fit into the journal-bearings $C^5$ and $C^6$, as shown in Fig. 9. These spur-wheels are of a size and character to engage with their teeth in the opposite racks $D^2$ and G', so that any movement of the plunger is necessarily concurrent with a movement of the counterweights in the opposite direction.

I is a face-plate secured to and moving with the crank-pin E in a groove formed on the face of the disk, the plate being of dimensions and character, as indicated in Figs. 7 and 8, to cover the slot $C^2$.

It will be obvious that any fluid introduced under sufficient pressure through the channels $A^2$ and $C^8$ will force the plunger D to move in the cylinder C', overcoming the force exerted by the spring F and moving the crank-pin E farther away from the center of its disk, and the movement of the crank-pin, as already noted, will automatically shift the position of the counterweights which are arranged to balance the other moving parts contained in the disk and maintain the weight of the whole in a substantially balanced condition. A relaxation of the pressure by permitting the fluid to escape permits the powerful spring F to move the plunger back to or toward its normal position, shifting the position of the crank-pin nearer to the center of the disk. The best method known to me for admitting and exhausting the fluid which controls the position of the crank-pin is through the crank-shaft of the engine, as indicated in Fig. 6, and where this method is availed of I carry the fluid from a pipe K', leading from the pump or other device where the necessary pressure and motion is given to the fluid, through channels $N^7$ and $N^6$, formed in a bracket $N^4$ of the engine-casing N. The channeled bracket $N^4$ has a perforation $N^5$ at its end in line with the perforation $A^2$ in the portion $A^5$ of the crank-shaft, and into this perforation $N^5$, I screw a pipe O, having threads $O^3$ at its outer end and conveniently a jam-nut $O^6$, the said pipe extending through the threaded perforation $A^8$ and into the cylindrical perforation $A^6$, with which it makes a nice fit. The portion $O^3$ of the pipe, which fits in the cylinder $A^6$, is formed with a multiplicity of annular channels, which on well-known principles have the effect of preventing leakage. I also prefer to form the pipe O with a collar $O'$, which will fit against the shoulder $A^7$, formed between the portions $A^6$ and $A^8$, and to secure the pipe O in proper position in the crank-shaft I employ a long heel-nut, (indicated at $O^5$,) which screws into the threaded perforation $A^8$, as shown.

Referring at this time to parts shown in connection with Figs. 5 and 6, but not forming any part of my present invention, I will state that P is a worm-wheel which operates a shaft $P'$, which through a universal connection $P^2$ rotates a shaft $P^3$, controlling the cams which regulate the admission and exhaust of the engine.

$P^4$ indicates a governor which by connection $P^5$ and a further connection $P^6$ operates to regulate valves of the engine, and $P^7$ is a clutch-starting device for setting the crank-shaft in motion and starting the engine, this device being held in place by a plate $O^4$ and a nut $O^7$, screwing on the threaded nut $A^9$ of the shaft.

The engine and other appliances thus partially indicated form the subject-matter of my other application for Letters Patent, filed December 15, 1898, Serial No. 699,312, and its divisions, Serial Nos. 715,695 and 715,696, filed May 5, 1899, and are partially shown in the present case merely because in actual practice I have used the devices to which this case especially refers in connection with the said engine and appliances and in the manner indicated in the drawings.

Referring now to Figs. 1, 2, 3, and 4, it will be noticed that the pipe $K'$, to which reference has already been made, leads to the pump-cylinder, (indicated at J.) This pump-cylinder is formed with an admission-port $J'$ and an exhaust-port $J^2$, the admission-port leading through a valve-box $J^3$, containing a non-return valve $J^5$, into a supply-pipe K, leading to a reservoir, such as indicated, for instance, at K in Fig. 1. The delivery-port $J^2$ leads through a valve-box $j^3$, also provided with a non-return valve $J^4$, and through a second valve-box $J^7$ into the pipe $K'$. A port $J^9$ connects the valve-boxes $J^3$ and $J^7$ through a port or passage which is normally held closed by a valve $J^8$.

L indicates the plunger working in the cylinder J and connected by means of a universal joint (indicated at $L'$) with a plunger-rod $L^2$, which in turn connects with the lower end $L^3$ of a lever $L^3 L^4$, pivoted at $L^5$, and the upper end $L^4$ of which is in convenient reach of the driver's seat, as shown in Fig. 1. The valve $J^8$ is connected with a stem M, having secured to its free end a downwardly-extending arm $M'$, (see Fig. 2,) having rearwardly-extending arms $M^2 M^2$.

$M^3$ is a shaft secured in bearings firmly connected with the pump-cylinder J and having at one end a cylindrical portion $M^4$, which lies between the arms $M^2 M^2$ and an upwardly-extending lever-arm $M^5$, as well as a cam, (indicated at $m^5$,) which presses against the portion of the arm $M'$ lying between the arms $M^2 M^2$. At the other end of the shaft $M^3$ is secured the hub $M^6$ of a lever $M^7$, which in turn is secured to a rod $M^9$, connected at its upper end with a lever $M^{10}$, which, as shown, is a foot-lever and is easily reached from the driver's seat. (See Fig. 1.) To the upper end of the lever $M^5$ is secured a rod $M^8$, which runs backward under the wagon-body, as shown in Fig. 1, and is connected with a lever $M^{11}$, to which is fastened a brake-band $M^{12}$, working on a brake-drum $Q^{22}$, as indicated at the right-hand side of Fig. 1.

When the operator desires to move the crank-pin E outward from the center of its disk, and thus to increase the throw of the clutches controlled by it, he moves the lever $L^4 L^3$, so as to operate the plunger L, drawing fluid, which will conveniently be oil, from the reservoir $k$ through the pipe K and the valve $J^3$ into the cylinder J, and forcing it out through the port $J^2$ and valve $j^3$ into the conduit $K'$ and thence through the passages described into the cylinder in the crank-pin disk. When, on the other hand, he desires to arrest or lessen the stroke of the clutches, he places his foot on the foot-lever $M^{10}$, moving the lever $M^7$ downward and rotating the shaft $M^3$ toward the left. This motion of the shaft presses the cam $m^5$ against the rod $M'$ and pushes it and the rod M inward through the rod M lifting the valve $J^8$ from its seat and permitting the flow of the liquid backward from the pipe $K'$ through the valve-box $J^7$ and port $J^9$ into the reservoir, the force of the spring in the crank-disk, as soon as the hydraulic pressure is relieved, forcing the crank-pin back to its central and inoperative position. At the same time in the construction shown the movement of the shaft $M^3$, acting through the lever $M^5$, rod $M^8$, and lever $M^{11}$, applies the brake to the rear or driven axle of the vehicle, and it will be seen that by the mechanism I have described I can at all times regulate the operation of the motor upon the rear axle or other driving-shaft of the machine without in any way checking or arresting the motion of the motor.

I have shown in Fig. 1 a lever $S^9$, within easy reach of the driver's seat, which is pivoted at $S^8$ and formed with an extension $S^7$, connecting through a rod $S^6$ with a lever $S^5$, which in turn operates a shaft $S^4$, having secured to its lower portions arms $S^3$, the purpose of which is to actuate a device acting directly upon the clutches and by which they are adjusted either to an inoperative position or to a position in which they operate in opposite directions. These devices form the subject-matter of my copending application filed December 7, 1898, Serial No. 698,514, and need not, therefore, be further described or illustrated in the present case.

In the figures of the drawings heretofore specifically referred to I have shown what I believe to be the best construction for operating the adjustable crank-pin. The mechanism described, however, is capable of many modifications without avoidance of my invention, and in Figs. 10, 11, and 12 I have illustrated one such modification. In these figures I have shown the disk $c$ with a central transverse cylinder $C^{10}$ and parallel lateral passages $C^{13}$ and have also illustrated the plunger as situated in the central cylinder and the counterweights in the lateral passages, the plunger and counterweights being operatively connected, as before, by means of spur-wheels $H^{10}$. In the modified construction, however, I have shown, instead of a spring F, acting directly on the plunger, two springs $ff$, acting directly on the counterweights, but of course indirectly on the plunger, in the same way as before. In place, however, of a single channel $C^3$, leading to one end of the cylinder $C^{10}$, I have in the modification shown two channels $c^{18}$, leading to opposite ends of the cylinder $C^{10}$ and connecting with two channels $a^{12}$, formed through the crank-shaft of the engine. In such a device as this the pump used for controlling the position of the crank-pin will draw from one side of the cylinder what it forces into the other side, but for obvious reasons is less conveniently practicable than the construction which I have previously described.

Having now described my invention, what I claim as new, and desire to secure by Letters Patent, is—

1. A rotary head having a transverse cylinder formed in it inside the plane of its outer face in combination with a plunger movable in the cylinder, a crank-pin secured directly to said plunger and so as to project from the outer face of the head, a driving-shaft for actuating the head and channels for introducing and exhausting pressure fluid to and from the cylinder to move the plunger and adjust the eccentricity of the crank-pin, said channels being formed in the shaft and head aforesaid.

2. A rotating head having a transverse channel formed in it said channel comprising a cylinder at one end, a plunger movable in the cylinder aforesaid and having a crank-pin secured in it, resilient means secured to the head and arranged to exert its force against the plunger to force it home in the cylinder and a channel for fluid under pressure leading to the outer end of the cylinder.

3. A rotating head having a transverse channel formed in it said channel comprising a cylinder at one end and a spring-chamber at the other, a plunger movable in the cylinder aforesaid and having a crank-pin secured to it, a spring situated in the spring-chamber and acting against the end of the plunger to force it home in the cylinder and a channel for fluid under pressure leading to the outer end of the cylinder.

4. A rotary head in combination with a transversely-movable slide having a crank-pin secured thereto, transversely-movable counterweight mechanism, means connecting the crank-pin slide and counterweight mechanism as described and so that they will move simultaneously and so as to balance each other and the head as a whole, and means for moving the slide to adjust the eccentricity of the crank-pin.

5. A rotary head in combination with a transversely-movable slide having a crank-pin secured thereto, transversely-movable counterweight mechanism, means connecting the crank-pin slide and counterweight mechanism as described and so that they will move simultaneously and so as to balance each other and the head as a whole, resilient means arranged to oppose the movement of the pin away from the center of the head, and means for moving the slide to adjust the eccentricity of the crank-pin.

6. A rotary head in combination with a transversely-movable slide having a crank-pin secured thereto, two counterweights, each moving in guides in the head parallel to the crank-pin slide and one on each side of said slide, racks formed in or secured to the opposite side of the slide and counterweights, pinions journaled in the head between the slide and counterweights with their teeth in engagement with the racks and means for actuating the slide and through it the pin and counterweight.

7. A rotary head in combination with a transversely-movable slide having a crank-pin secured thereto, two counterweights, each moving in guides in the head parallel to the crank-pin slide and one on each side of said slide, racks formed in or secured to the opposite sides of the slide and counterweights, pinions journaled in the head between the slide and counterweights with their teeth in engagement with the racks, resilient means arranged to oppose the movement of the pin and connected parts away from the position they occupy when the pin is at the center of the head, and means for actuating the slide and through it the pin and counterweights.

8. The rotating head $c$ having a central transversely-extending cylinder $C'$ and lateral parallel channels $C^3$ $C^3$, a slot $C^2$ formed in the face of the head leading into cylinder $C'$, connecting passages $C^4$ $C^4$ between the cylinder $C'$ and the channels $C^3$ $C^3$ and a fluid-channel $C^8$ leading to one end of cylinder $C'$ in combination with a plunger working in the cylinder $C'$ and having a crank-pin E attached to it and projecting through slot $C^2$ counterweights working in channels $C^3 C^3$, the plunger and counterweights having their opposite sides provided with racks, and spur-wheels H H journaled in passages $C^4 C^4$ having their teeth in engagement with the racks aforesaid.

9. The rotating head $c$ having a central transversely-extending cylinder $C'$ and lateral parallel channels $C^3 C^3$, a slot $C^2$ formed in the face of the head leading into cylinder $C'$, connecting passages $C^4 C^4$ between the cylinder $C'$ and the channels $C^3 C^3$ and a fluid-channel $C^8$ leading to one end of cylinder $C'$ in combination with a rim C surrounding the head, a plunger working in the cylinder $C'$ and having a crank-pin E attached to it and projecting through slot $C^2$, counterweights working in channels $C^3 C^3$, the plunger and counterweights having their opposite sides provided with racks, and spur-wheels H H journaled in passages $C^4 C^4$ having their teeth in engagement with the racks aforesaid.

10. In combination with a head having a transverse cylinder formed in it and a channel formed in the head leading from its center to one end of the cylinder aforesaid, a shaft secured to the head and having a channel formed through it said channel connected with the channel in the head at one end and with a cylindrical enlargement $A^6$ at the other end of the shaft, a fixed tube O having a portion $O^2$ fitting in cylinder $A^6$ and formed with a multiplicity of annular grooves on its outer surface and a support for the outer end of the tube having a port as $N^6$ in communication with the end of the tube.

11. In combination with a head having a transverse cylinder formed in it and a channel formed in the head leading from its center to one end of the cylinder aforesaid, a shaft secured to the head and having a channel formed through it said channel connecting with the channel in the head at one end and with an inner cylindrical enlargement $A^6$ and through said enlargement $A^6$ into an outer larger and threaded enlargement $A^8$ at the other end of the shaft, a fixed tube O having a portion $O^2$ fitting in cylinder $A^6$ and formed with a multiplicity of annular grooves on its outer surface, an annular shoulder O adapted to rest on a shoulder $A^7$ at the end of enlargement $A^8$, a threaded tubular bushing $O^5$ screwing into the enlargement $A^8$ and around tube O, and a support for the outer end of the tube having a port as $N^6$ in communication with the end of the tube.

12. In combination with a rotating head having a transverse hydraulic cylinder formed in it and a crank-pin-actuating plunger movable therein, resilient means tending to force the plunger home in its cylinder and to hold the pin in or about a central position, a channel leading to the end of the cylinder in the head, a reservoir of liquid, a pump-cylinder connected to said reservoir and to the channel leading to the cylinder in the head, a plunger working in the pump-cylinder, valves arranged as described and so that the plunger will draw liquid from the reservoir and force it into the cylinder in the head, a port connecting the delivery-passage of the pump and the reservoir, a normally-seated valve for closing said port, means for opening said valve at will and means for actuating the pump-plunger.

13. In combination with a rotating head having a transverse hydraulic cylinder formed in it and a crank-pin-actuating plunger movable therein, mechanism driven by said crank-pin including a brake-drum, a brake arranged to check the movement of said mechanism by pressure on said drum, resilient means tending to force the plunger home in its cylinder and to hold the pin in or about a central position, a channel leading to the end of the cylinder on the head, a reservoir of liquid, a pump-cylinder connected to said reservoir and to the channel leading to the cylinder in the head, a plunger working in the pump-cylinder, valves arranged as described and so that the plunger will draw liquid from the reservoir and force it into the cylinder in the head, a port connecting the delivery-passage of the pump and the reservoir, a normally-seated valve for closing said port, a lever arranged when actuated to simultaneously open said valve and apply the brake and means for actuating the pump-plunger.

GEORGE S. STRONG.

Witnesses:
CHAS. F. MYERS,
D. STEWART.